Patented Feb. 6, 1923.

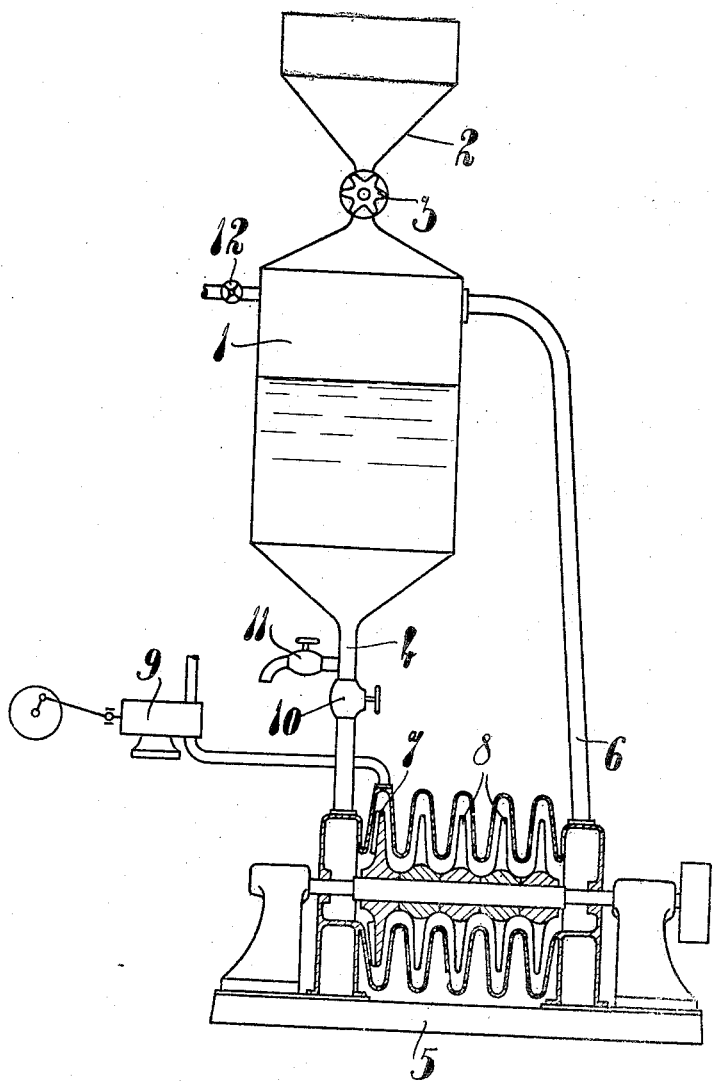

1,444,255

UNITED STATES PATENT OFFICE.

JOHAN HJALMAR LIDHOLM, OF WARGON, SWEDEN.

METHOD OF PRODUCING CYANAMIDE.

Application filed March 3, 1921. Serial No. 449,565.

*To all whom it may concern:*

Be it known that I, JOHAN HJALMAR LIDHOLM, a citizen of the Kingdom of Sweden, residing at Wargon, Sweden, have invented new and useful Methods of Producing Cyanamide, of which the following is a specification.

As well known the production of cyanamide from calcium cyanamide by treating the latter with water and carbon dioxide is very difficult owing to the fact that the cyanamide is rapidly polymerized to dicyandiamide in alkaline solution.

In my United States Patent No. 1,380,223, dated May 31, 1921, I have described a method of overcoming said difficulty by gradually supplying the calcium cyanamide while simultaneously supplying carbon dioxide in a sufficient quantity to precipitate the calcium as carbonate according as the calcium cyanamide is supplied to the solution.

This invention has for its object to provide an improvement of said method and an apparatus for carrying out this improved method on a commercial scale enabling an effective treatment of large quantities of calcium cyanamide for producing concentrated cyanamide solutions practically free from dicyandiamide.

The invention consists, chiefly, in that the calcium cyanamide is gradually added to a predetermined quantity of water or of cyanamide solution which is kept in continuous circulation by means of a pumping and beating device into which carbon dioxide is supplied and caused by the beating operation to intimately contact with the calcium cyanamide dissolved or suspended in the water.

The invention is illustrated in the accompanying drawing, in which an apparatus for carrying out the said improved method is shown diagrammatically.

1 indicates a vessel provided with a hopper 2 through which the calcium cyanamide to be treated is supplied, a rotary star wheel 3 being provided at the lower end of the hopper to gradually feed the calcium cyanamide into the vessel. The vessel 1 communicates through a pipe 4 outgoing from the bottom of the vessel with the suction end of a combined pumping and beating apparatus 5 the outlet end of which is connected by a pipe 6 to the upper part of the vessel 1 whereby a closed circulating system is obtained. The first compartment of the pumping and beating device contains a wing wheel 7 and is constructed as an ordinary centrifugal pump, while the other compartments only contain wheels 8 having stirring or beating arms for effecting a stirring operation only but no pumping action. 9 is a pump for introducing carbon dioxide or gases containing carbon dioxide into the circulation system immediately behind the pump wheel 7. 10 is a valve to control the connection between the vessel 1 and the apparatus 5 and 11 is a valve through which the contents of the vessel 1 may be tapped after the valve 10 has been closed. 12 is an outlet for the carbon dioxide which has not been absorbed by the solution but has been separated therefrom in the vessel 1. This carbon dioxide may, if desired, be returned to the pump 9 to be again supplied to the solution. Cooling of the reaction mixture may be effected by inserting any appropriate liquid cooler at a suitable point of the circulation system, as, for instance, in the conduit 6 extending between the pumping and beating device and the vessel, or simply by providing the pumping and beating device with a cooling jacket. In the preferred embodiment illustrated the pumping and beating devices are shown as combined into a single apparatus; it should be understood, however, that there may be also used a separate pump and a beating apparatus connected to the pump by means of a pipe line.

In operation, the vessel 1 is first filled to a suitable level with pure water or with wash water containing cyanamide and obtained from a preceding operation, while the hopper 2 is filled with pulverized calcium cyanamide. Then, the valve 10 is opened and the pumping and beating device is started, and at the same time the star wheel 3 is started to feed the calcium cyanamide into the vessel 1, and the carbon dioxide pump 9 is started to impress carbon dioxide into the solution upon the pressure side of the pump wheel 7, whereupon the beating wheels effect an intimate mixing of the carbon dioxide with the reaction mixture. The operation is continued, until such a quantity of calcium cyanamide has been fed in that the calcium and graphite sludge produced prevents an effective treatment with carbon dioxide which when using pure water at the beginning of the process will usually occur when the solution contains about 20 to 25 percent of cyanamide. Then, the vessel is emptied, and the mass is tapped off, filtered and washed with pure water for separating the cyanamide produced from the solid residues.

What I claim is:

1. The method of producing a cyanamide solution practically free from dicyandiamide, which comprises continuously circulating an aqueous solution in a closed circulating system containing a pumping device, and gradually supplying calcium cyanamide to the circulating solution on the suction side of the pumping device and carbon dioxide on the pressure side of said device.

2. The method of producing a cyanamide solution practically free from dicyandiamide, which comprises continuously circulating an aqueous solution in a closed circulating system containing a pumping and agitating device, gradually supplying calcium cyanamide to the solution on the suction side of the pumping device and carbon dioxide on the pressure side of the device and agitating the mixture until the carbon dioxide is essentially absorbed by the solution so as to precipitate the calcium as calcium carbonate.

3. The method of producing a cyanamide solution practically free from dicyandiamide, which comprises continuously circulating an aqueous solution of cyanamide in a closed circulating system, adding to the solution calcium cyanamide and carbon dioxide in regulated quantities and thoroughly agitating the mixture before further quantities of calcium cyanamide are added.

4. The method of producing concentrated cyanamide solutions practically free from dicyanamide, consisting in continuously circulating an aqueous solution of cyanamide, gradually adding to the solution calcium cyanamide at one point and carbon dioxide at another point of the circulating system and thoroughly agitating the mixture until the calcium is precipitated as calcium carbonate.

In testimony whereof I have signed my name.

JOHAN HJALMAR LIDHOLM.